UNITED STATES PATENT OFFICE.

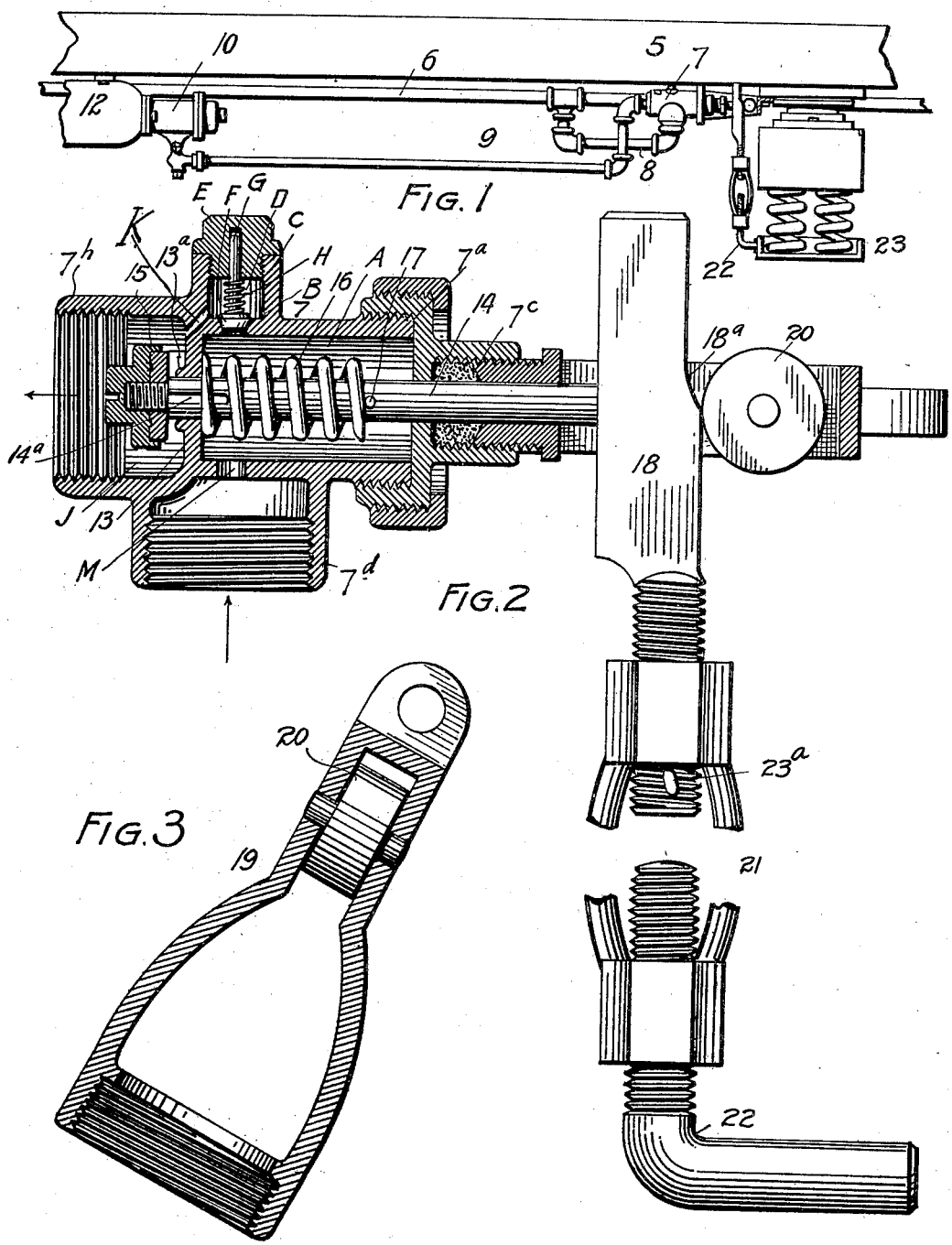

WILLIAM H. SAUVAGE, OF DENVER, COLORADO, ASSIGNOR TO THE SAUVAGE DUPLEX AIR BRAKE COMPANY, OF SAME PLACE.

AIR-BRAKE MECHANISM.

SPECIFICATION forming part of Letters Patent No. 676,852, dated June 18, 1901.

Application filed September 28, 1900. Serial No. 31,362. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Air-Brake Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in air-brake mechanism in which an extra set of brake devices comprising a triple valve, an auxiliary reservoir, and a brake-cylinder is employed and arranged to be automatically brought into requisition by the gravity of the load on the car, the said extra set of devices being normally idle—that is to say, when the car is empty. In constructions of this class a valve is connected with the main train-brake pipe and with a branch pipe leading to the triple valve of the extra brake mechanism. As the spring-supported car-body is depressed by the weight of the load this valve is opened.

My present improvement consists in the employment of means whereby the air is allowed to pass from the main train-brake pipe through the branch pipe to the auxiliary reservoir of the extra set of brake mechanism when the main valve is closed, but so arranged that there can be no reduction of pressure in the branch pipe while the main valve is closed. Hence by means of my improvement the auxiliary reservoir is always charged with air, but this air cannot pass to the extra brake-cylinder until the load on the car is sufficient to open the main valve. In other words, while the auxiliary reservoir of the extra set of brake devices is always charged with air ready for use the extra set of brake mechanism cannot be brought into requisition to increase the braking force until the load is such as to require and make it practicable to use such braking force.

The invention will now be described in detail, reference being made to the accompanying drawings, in which—

Figure 1 is a fragmentary side elevation of a car equipped with my improvements. Fig. 2 is a section taken through the valve mechanism, the parts being shown on a larger scale. Fig. 3 is a detail view of the yoke carrying the antifrictional roller, shown on the same scale as in Fig. 2.

The same reference characters indicate the same parts in all the views.

Let the numeral 5 designate the spring-supported car-body; 6, the main train-brake pipe; 7, the valve-casing; 8, a short branch pipe leading from the train-brake pipe to the valve-casing, and 9 another branch pipe leading from the valve-casing to the triple valve 10 of the auxiliary reservoir 12. The valve-casing is provided with a diaphragm 13, provided with an opening through which the stem 14 of the valve 15 passes. The opening in the diaphragm is surrounded by a valve-seat $13^a$. The valve-stem is provided with one or more grooves $14^a$, of sufficient length to allow the air to pass freely from one side of the diaphragm to the other when the valve is unseated. The valve 15 is held normally closed by a coil-spring 16, surrounding the valve-stem on the opposite side of the diaphragm from the valve. One extremity of this spring engages the diaphragm and the other extremity a stop 17 on the valve-stem. The valve-casing is provided with a screw-cap $7^a$, having an opening surrounded by a stuffing-box $7^c$, through which the valve-stem passes. The valve-stem protrudes from the stuffing-box to engagement with a rod 18. A yoke 19 is screwed to the cap $7^a$ of the valve-casing. In this yoke is journaled an antifrictional roller 20. The rod 18 passes through the yoke between the valve-stem extremity and the roller 20. This rod is provided on the side adjacent the roller with an offset $18^a$. Above this offset the rod is reduced in size, and the arrangement is such that the roller engages this reduced portion of the rod when the car is empty and the valve 15 is closes by the action of the spring 16. When, however, the car-body, together with the valve-casing and yoke, are depressed sufficiently to cause the roller to pass the offset $18^a$, the rod 18 is forced against the valve-stem extremity and the valve opened. The rod 18 is connected, by means of a turnbuckle 21, with a bent rod 22, one extremity of which is threaded in the turnbuckle, while the other extremity is connected with the sand-board 23 or a relatively stationary part of the car. The lower extremity of the rod 18 is threaded in the upper collar of the turnbuckle. By means of the turnbuckle the rod 18 may be so set or adjusted that the valve 15 will be opened when the car-body has been depressed a predetermined distance. A cotter 23$^a$ or other suitable device is inserted in the lower extremity of the rod 18 below the turnbuckle collar and is of sufficient length to normally lock the turnbuckle against turning. When it is desired to adjust the rod, this device 23$^a$ is removed.

In one side of the valve-casing and communicating with the chamber A thereof is formed a port B, leading to a branch casing C, inclosing a chamber D, closed by a screw-cap E. The port B is normally closed by a valve F, connected with a stem G, surrounded by a weak coil-spring H, one extremity of which engages the valve, while the other extremity bears against the cap E. The valve-chamber D is connected with the valve-chamber J by a port K.

The operation is as follows: As the air passes from the train-pipe 6 through the pipe 8, which is screwed into a socket 7$^d$ of the casing 7, it enters the chamber A by way of a port M. Assuming that the valve 15 is closed, the air opens the check-valve F, since the weak spring yields readily to the train-pipe pressure. The air passes thence into the chamber J by way of the port or passage K, and thence through the pipe 9 (which is screwed into the threaded valve-chamber extension 7$^h$) into the triple valve, and thence to the auxiliary reservoir, which is charged thereby. It is now evident that a reduction of pressure in the train-brake pipe will serve to close the valve F tightly. Hence the reduction of pressure in the train-pipe will not reach the branch pipe 9 and the triple valve 10, and the triple-valve piston and slide-valve (not shown) will not be actuated to allow the air to pass from the auxiliary reservoir to the brake-cylinder. (Not shown.) When, however, the car is loaded sufficiently to cause the yoke-roller 20 to pass the offset 18$^a$ of the rod 18, the valve 15 will be opened, forming a free communication between the train-brake pipe and the extra set of brake mechanism both for applying and releasing the brakes. When the car-body is depressed by the load to the point where the valve 15 is about to open, the vibration of the car may open the valve 15 while the engineer is making the necessary reduction in the train-brake pipe to apply the brakes. In this case the extra set of brake mechanism will be brought into requisition as a braking force. When, however, the engineer restores the normal pressure in the train-pipe to release the brakes, the valve 15 may be closed, since under the circumstances assumed the said valve may open and close alternately. In this event the normal pressure will be reduced in the branch pipe 9 through the port B and the passage K, thus releasing the brakes promptly notwithstanding the closing of the valve 15.

The mechanism shown herein for operating the main valve 15 is broadly claimed in my simultaneously pending application, filed September 28, 1900, Serial No. 31,361.

Having thus described my invention, what I claim is—

1. In an air-brake system the combination with a pipe leading from a source of compressed air, and brake mechanism, of a normally-closed main valve located therein, and a check-valve controlling a by-pass through which the air passes on its way to the triple valve, and an auxiliary reservoir whereby the latter is charged, the arrangement being such that a reduction of pressure in the source of air-supply closes the check-valve and prevents any reduction in the pipe or conduit communicating with the triple valve.

2. In an air-brake system, the combination with the train-brake pipe and a branch pipe leading to the brake mechanism, of a valve-casing connected with the train-brake pipe and the branch pipe, a normally-closed main valve located therein, a controlling-port which when open establishes communication with the brake mechanism, for brake applying and releasing purposes, and a check-valve controlling a by-pass through which the air passes to the branch pipe and thence to the triple valve and auxiliary reservoir, whereby the latter is charged, the arrangement being such that a reduction of pressure in the train-brake pipe seats the check-valve and prevents a reduction of pressure in the branch pipe whereby the brake mechanism cannot be brought into requisition until the main valve is open.

3. The combination with brake mechanism, the train-brake pipe and the branch pipe leading to the brake mechanism, of a casing provided with a diaphragm dividing the inclosed casing-chamber into two compartments, communicating with each other by a port in the diaphragm, one of said chamber-compartments being in communication with the train-brake pipe, and the other with the branch pipe, a main valve normally closing the port in the diaphragm, and a check-valve controlling a passage leading from one compartment to the other and arranged to allow the air to pass from the compartment connected with the train-brake pipe, to the other compartment, but preventing its return.

4. In an air-brake system, the combination with the train-brake pipe, a branch pipe and brake mechanism, of a casing divided by an apertured diaphragm into two compartments and communicating respectively with the train-brake pipe and the branch pipe, a valve normally closing the opening in the diaphragm, a check-valve controlling a passage leading from the one compartment to the other of the valve-casing, and arranged to allow the air to pass from the compartment connected with the train-pipe to the compartment connected with the branch pipe, but preventing its return, and means connected with the main valve whereby the latter is opened by the depression of the car-body a predetermined distance.

5. In an air-brake system, the combination with the train-brake pipe, a branch pipe, and brake mechanism connected with the branch pipe, of a valve-casing divided into two compartments and communicating by a port, a valve normally closing said port and provided with a stem protruding from the casing, means mounted on a relatively stationary part of the car for engaging said valve-stem and opening the valve when the car-body is depressed a predetermined distance, and a check-valve controlling a by-pass connecting the two chamber-compartments of the valve-casing, and arranged to allow the air to pass from one compartment to the other, but preventing its return.

6. In an air-brake system, the combination with the train-brake pipe, a branch pipe and brake mechanism, of a casing, an apertured diaphragm dividing the casing into two compartments, one of which is connected with the train-brake pipe and the other with the branch pipe, a spring-held valve normally closing the opening in the diaphragm, and provided with a stem protruding from the casing, a rod mounted on a relatively stationary part of the car and arranged to engage the valve-stem and open the valve as the car-body is depressed, and a check-valve controlling a by-pass leading from one chamber-compartment to the other of the valve-casing, the arrangement being such that the air is allowed to pass from the compartment connected with the train-brake pipe to the compartment connected with the branch pipe, but preventing its return while the main valve is closed.

7. In an air-brake system, the combination with the train-brake pipe, a branch pipe and brake mechanism, of a casing, an apertured diaphragm dividing the casing into two compartments, one of which is connected with the train-brake pipe and the other with the branch pipe, a spring-held valve normally closing the opening in the diaphragm, and provided with a stem protruding from the casing, a yoke connected with said casing, a rod mounted on a relatively stationary part of the car and passing through the yoke to engagement with the valve-stem, said rod being provided with an offset which is engaged by a bearing on the yoke whereby the valve-stem is actuated sufficiently to open the valve when the car-body has been depressed a predetermined distance, and a check-valve controlling a by-pass leading from one chamber-compartment to the other of the valve-casing.

8. In an air-brake system the combination with the train-brake pipe, a branch pipe and brake mechanism, of a casing, an apertured diaphragm dividing the casing into two compartments, one of which is connected with the train-brake pipe and the other with the branch pipe, a spring-held valve normally closing the opening in the diaphragm, and provided with a stem protruding from the casing, a check-valve controlling a by-pass leading from one chamber-compartment to the other of the valve-casing, a yoke connected with the valve-casing and provided with a bearing located opposite the valve-stem extremity, a rod having a turnbuckle connection with a relatively stationary part of the car, and passing through the yoke between the valve-stem extremity and the yoke-bearing, and a rod having an offset arranged to engage the yoke-bearing when the car-body has been depressed a predetermined distance, whereby the valve-stem is actuated to open the valve.

In testimony whereof I affix my signature in presence of two witnesses.

WILLIAM H. SAUVAGE.

Witnesses:
MARY C. LAMB,
DORA C. SHICK.